US010518390B2

(12) United States Patent
Takahashi

(10) Patent No.: US 10,518,390 B2
(45) Date of Patent: Dec. 31, 2019

(54) CLAMP APPARATUS

(71) Applicant: PASCAL ENGINEERING CORPORATION, Itami-shi, Hyogo (JP)

(72) Inventor: Takuya Takahashi, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 419 days.

(21) Appl. No.: 15/301,774

(22) PCT Filed: Mar. 4, 2015

(86) PCT No.: PCT/JP2015/056355
§ 371 (c)(1),
(2) Date: Oct. 4, 2016

(87) PCT Pub. No.: WO2015/151702
PCT Pub. Date: Oct. 8, 2015

(65) Prior Publication Data

US 2017/0113329 A1 Apr. 27, 2017

(30) Foreign Application Priority Data

Apr. 4, 2014 (JP) ................................ 2014-077825

(51) Int. Cl.
*B23Q 3/08* (2006.01)
*B25B 5/06* (2006.01)
*B25B 5/16* (2006.01)

(52) U.S. Cl.
CPC ................ *B25B 5/064* (2013.01); *B25B 5/16* (2013.01)

(58) Field of Classification Search
USPC .................................. 269/24, 25, 32, 33, 34
See application file for complete search history.

(56) References Cited

U.S. PATENT DOCUMENTS

| | | | | |
|---|---|---|---|---|
| 8,517,360 B2 * | 8/2013 | Kawakami | ............ | B23Q 1/009 269/20 |
| 2005/0121846 A1 * | 6/2005 | Kawakami | ............ | B23B 31/402 269/309 |

(Continued)

FOREIGN PATENT DOCUMENTS

| | | |
|---|---|---|
| JP | 51-001577 Y1 | 1/1976 |
| JP | 51-29378 B1 | 1/2013 |

(Continued)

*Primary Examiner* — Joseph J Hail
*Assistant Examiner* — Shantese L McDonald
(74) *Attorney, Agent, or Firm* — Norris McLaughlin, P.A.

(57) ABSTRACT

The fluid clamp apparatus includes: a sliding piston member that vertically partitions its cylinder bore; first and second fluid pressure operation chambers; a fluid passage that, during an upward light-load stroke of the piston member, causes the back pressure in the second fluid pressure operation chamber to be received by the output rod to advance the output rod; a force multiplying mechanism that, during a heavy-load stroke of the piston member, multiplies the force acting on the piston member and transmits this force to the output rod; and a link mechanism that, during unclamping lowering operation of the piston member, links together the output rod and the piston member after lowering by a predetermined stroke amount.

7 Claims, 8 Drawing Sheets

(56) References Cited

U.S. PATENT DOCUMENTS

| | | | | |
|---|---|---|---|---|
| 2006/0131803 | A1 * | 6/2006 | Yonezawa | B25B 5/06 269/309 |
| 2007/0063406 | A1 | 3/2007 | Soroka et al. | |
| 2013/0199366 | A1 | 8/2013 | Yokota | |
| 2014/0109759 | A1 * | 4/2014 | Yokota | B25B 5/061 91/167 R |
| 2014/0191456 | A1 * | 7/2014 | Yokota | B25B 5/04 269/25 |

FOREIGN PATENT DOCUMENTS

| | | | |
|---|---|---|---|
| WO | 2004/065060 | A1 | 8/2004 |
| WO | 2012/070189 | A1 | 5/2012 |
| WO | 2013/031061 | A1 | 3/2013 |

* cited by examiner

CLAMP APPARATUS

BACKGROUND OF THE INVENTION

The present invention relates to a clamp apparatus that clamps a workpiece or the like that is to be supplied for machining processing, and in particular relates to such a clamp apparatus in which it is arranged to perform clamp driving while multiplying the clamping force that acts on a piston member by fluid pressure.

In a clamp apparatus that employs fluid pressure, it is possible to strengthen the clamping force by increasing the pressure reception area of the piston member. However, in this case, the clamp apparatus is increased in size, and this is disadvantageous because it reduces the freedom in designing the system. Thus, various types of clamp apparatus have been implemented in which the clamping force is strengthened by the provision of a force multiplication mechanism (servomechanism). In particular, there are a number of examples of provision of a force multiplication mechanism when pressurized air is used as the pressurized fluid.

In the clamp apparatus described in FIG. 4 of JP Patent 5,129,378: a cylinder bore is formed within the clamp main body; a first piston fitted in the cylinder bore, and an axial second piston fitted into the first piston, are installed so as to slide freely; an output rod is formed integrally with the second piston; a tubular portion that projects from above into the interior of the upper end portion of the first piston is formed integrally with the clamp main body; and there is provided a force multiplication mechanism which multiplies force generated by fluid pressure acting on the first piston and transfers the result to the second piston. There is also provided a compression spring for maintaining clamping force to bias the first piston in the direction for clamping operation.

The force multiplication mechanism includes: a plurality of support holes in the tubular portion; a plurality of spheres installed in these support holes so as to be movable in radial directions; a part conical surface that is formed on the inner surface of the upper end portion of the first piston; and a plurality of cam grooves that are formed on the second piston so as to be capable of contacting against the plurality of spheres. A first fluid pressure operation chamber is defined below the first and second pistons in the cylinder bore, and a second fluid pressure operation chamber is defined above the first and second pistons.

SUMMARY OF THE INVENTION

With the clamp apparatus of JP Patent 5,129,378, by the second piston and the output rod being formed integrally with one another, and by the first piston being formed to be tubular in order for the fluid pressure operating inside the first fluid pressure chamber to operate on the second piston, the output rod is driven in the direction for clamp operation by the fluid pressure within the first fluid pressure chamber being received by the second piston.

While the clamping force is the resultant of a first force obtained by a force generated by the fluid pressure in the first fluid pressure operation chamber and received by the tubular first piston being multiplied by the force multiplication mechanism, and a second force that is generated by fluid pressure in the first fluid pressure operation chamber operating on the second piston, this is not optimal from the standpoints of strengthening the clamping force and of making the clamp apparatus more compact, since the second force is not a force that has been multiplied by the force multiplication mechanism.

Moreover, during clamping release, when the first and second piston are driven in the clamp release direction by the fluid pressure acting in the second fluid pressure chamber, since the first piston is biased in the clamping direction by the spring for maintaining clamping and moreover the pressure reception area also is small because the first piston is tubular, accordingly there is a fear that the operation of lowering the first piston with respect to the second piston may be delayed, in which case an unreasonably large force may act on the force multiplication mechanism.

The object of the present invention is to provide a clamp apparatus, employing a piston member that partitions its cylinder bore, that is capable of transmitting all of the force operating on the piston member due to fluid pressure to an output rod, while multiplying this force by a force multiplication mechanism.

The present invention presents a clamp apparatus including a clamp main body, an output rod that is fitted in this clamp main body so as to move freely upward and downward therein and capable of projecting out from an upper end of the clamp main body, and a vertically oriented cylinder bore formed within the clamp main body, characterized by comprising: a sliding piston member that vertically partitions the cylinder bore; first and second fluid pressure operation chambers defined in the cylinder bore below and above the piston member; a fluid passage that, during an upward light-load stroke of the piston member due to fluid pressure in the first fluid pressure operation chamber, causes a back pressure in the second fluid pressure operation chamber to be received by the output rod, so that the output rod is advanced thereby; a force multiplication mechanism that, during a heavy-load stroke of the piston member at the conclusion of raising operation thereof, multiplies a force acting on the piston member due to the fluid pressure in the first fluid pressure operation chamber, and transmits this force to the output rod; and a link mechanism that, during unclamping lowering operation of the piston member, links together the output rod and the piston member after lowering by a predetermined stroke amount.

In a preferable first aspect of the present invention, the force multiplication mechanism comprises: a tubular portion that is formed on the clamp main body so as to project from above into the second fluid pressure operation chamber; a plurality of spheres that are installed in a plurality of support holes of this tubular portion so as to be movable in radial directions; a first part conical surface that is formed on the piston member so as to become larger in diameter upward; and a second part conical surface that is formed on a lower end portion of the output rod so as to become larger in diameter upward.

In a preferable second aspect of the present invention, the link mechanism comprises: a rod insertion hole that is formed in a lower end portion of the output rod and whose lower end is open; a connecting rod that is inserted into the rod insertion hole from below so as to slide freely therein, and that is formed integrally with the piston member; an elongated hole that is formed in a cylindrical wall of the output rod surrounding the rod insertion hole and that is slender in the vertical direction; and a link pin that is fixed to the connecting rod and is loosely fitted in the elongated hole.

In a preferable third aspect of the present invention, there is provided with a biasing means comprising a spring reception hole extending from the rod insertion hole upward and a compression spring housed in the spring reception hole, and that biases the output rod upward with respect to the piston member.

In a preferable fourth aspect of the present invention, there is provided with a compression spring that is installed in the first fluid pressure operation chamber and that biases the piston member upward toward clamping operation.

In a preferable fifth aspect of the present invention, there is provided with a poor clamping detection mechanism comprising a fluid passage formed within the clamp main body and an open/close valve mechanism that can open and close an intermediate portion of the fluid passage, and that maintains a first state of being closed or open in a state in which the piston member has not arrived at its upper shifting limit position, while changing over to a second state of being open or closed in a state in which the piston member has arrived at its upper shifting limit position.

In a preferable sixth aspect of the present invention, the clamp apparatus is a link type clamp apparatus comprising a clamp arm that is coupled by a pin to an outer end portion of the output rod, and a link member that links an intermediate portion of that clamp arm to the clamp main body.

Since, according to the present invention, this clamp apparatus comprises a clamp main body, an output rod, a cylinder bore, a piston member, first and second fluid pressure operation chambers defined in the cylinder bore below and above the piston member, a fluid passage that, during an upward light-load stroke of the piston member due to fluid pressure in the first fluid pressure operation chamber, causes the back pressure in the second fluid pressure operation chamber to be received by the output rod, a force multiplication mechanism that, during a heavy-load stroke of the piston member at the conclusion of raising operation thereof, multiplies the force acting on the piston member due to the fluid pressure in the first fluid pressure operation chamber, and transmits this force to the output rod, and a link mechanism that, during unclamping lowering operation of the piston member, links together the output rod and the piston member after lowering by a predetermined stroke amount, accordingly the following beneficial effects are obtained.

Since a structure is provided in which the piston member partitions the cylinder bore vertically, and the force generated on the piston member by the fluid pressure in the first fluid pressure operation chamber is multiplied by the force multiplication mechanism and is transmitted to the output rod, accordingly it is possible to strengthen of the clamping force, and it is possible to contemplate making the clamp apparatus more compact. And it is possible to adopt this structure in which the piston member partitions the cylinder bore vertically, since, when the piston member is moved upward at light load, the output rod receives the back pressure in the second fluid pressure chamber and operates to advance, and since it is not necessary for the fluid pressure in the first fluid pressure operation chamber to act on the output rod.

Moreover, since the link mechanism is provided which, during the unclamping operation in which the piston member is lowered, links together the output rod and the piston member after lowering through the predetermined stroke, and since the output rod is kept in the stopped state until the piston member has been lowered through the predetermined stroke, accordingly no unreasonable force acts on the force multiplication mechanism, and the lowering operation of the piston member with respect to the output rod is not delayed.

In other words, since the output rod receives the fluid pressure in the second fluid pressure operation chamber and is biased upward, accordingly first the output rod is kept in the stopped state, and the output rod only lowers together with the piston member after the piston member has been lowered through the predetermined stroke.

And since, according to the preferable first aspect, the force multiplication mechanism has a structure that comprises a tubular portion that is formed on the clamp main body, a plurality of spheres, a first part conical surface that is formed on the piston member, and a second part conical surface that is formed on the lower end portion of the output rod, accordingly a force multiplication mechanism is obtained that has a simple structure.

And since, according to the preferable second aspect, the link mechanism comprises a rod insertion hole in the lower end portion of the output rod, a connecting rod that is inserted into the rod insertion hole and is formed together with the piston member, an elongated hole that is formed in the cylindrical wall surrounding the rod insertion hole, and a link pin that is fixed to the connecting rod and is loosely fitted in the elongated hole, accordingly a link mechanism of a simple structure and having excellent reliability results.

And since, according to the preferable third aspect, there is provided a biasing means comprising a spring reception hole formed in the output rod and a compression spring housed in the spring reception hole, and that biases the output rod upward, accordingly, when the piston member is shifting under light load, the rising operation of the output rod becomes smooth.

And since, according to the preferable fourth aspect, a compression spring is provided that biases the piston member upward toward clamping operation, accordingly it is possible to strengthen the drive force for clamping, and to strengthen the holding force that maintains the clamped state.

And since, according to the preferable fifth aspect, there is provided a poor clamping detection mechanism that includes a fluid passage formed within the clamp main body and an open/close valve mechanism that can open and close an intermediate portion of that fluid passage, and that changes over between the open state and the closed state when the piston member has arrived at its upper shifting limit position, accordingly, during driving for clamping, it is possible to detect the poorly clamped state in which the piston member has arrived at its upper shifting limit position.

And, according to the preferable sixth aspect, it is possible to provide a link type clamp apparatus including a clamp arm coupled by a pin to an outer end portion of the output rod, and a link member that links an intermediate portion of the clamp arm to the clamp main body.

DETAILED DESCRIPTION OF THE INVENTION

Various embodiments will now be explained on the basis of the following description.

Embodiment 1

Figure 1:
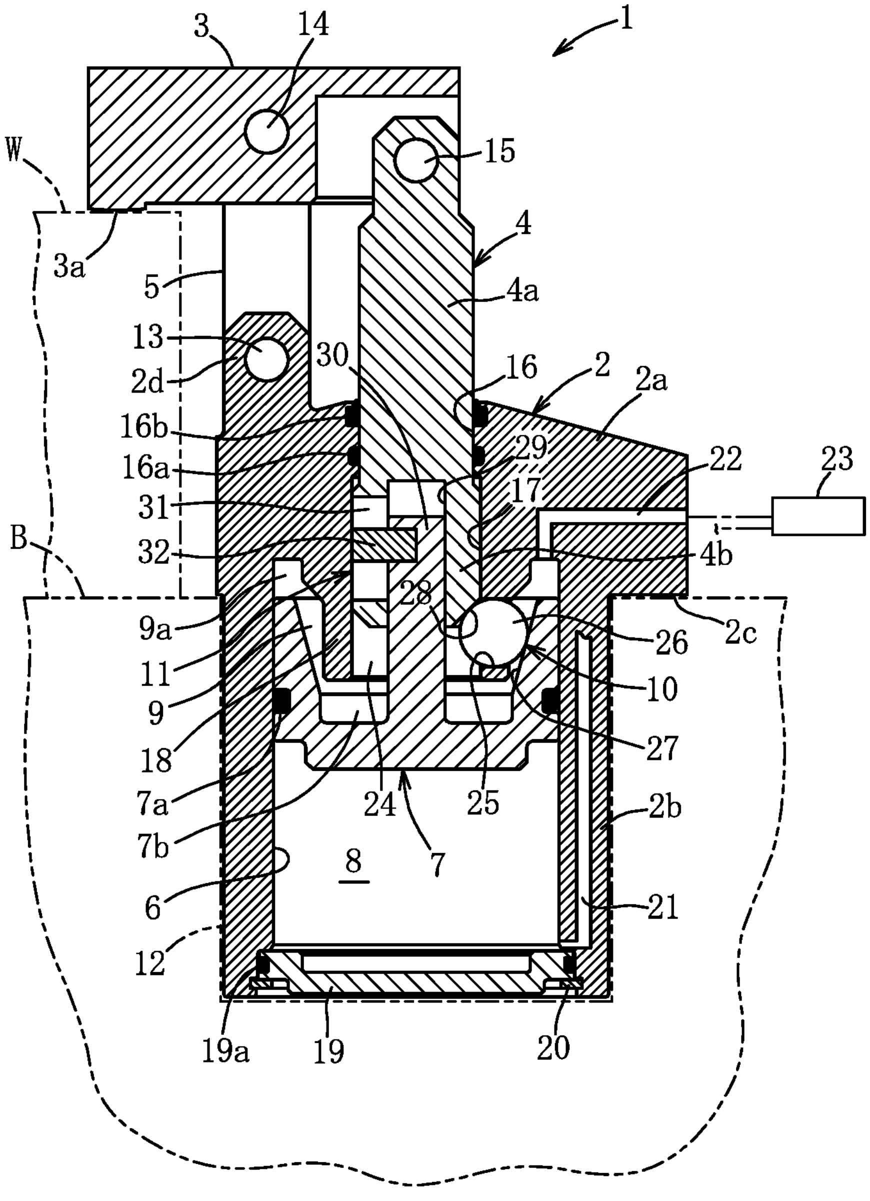
FIG. 1 is a sectional view of a clamp apparatus (clamped state) according to a first embodiment of the present invention.
Figure 2:
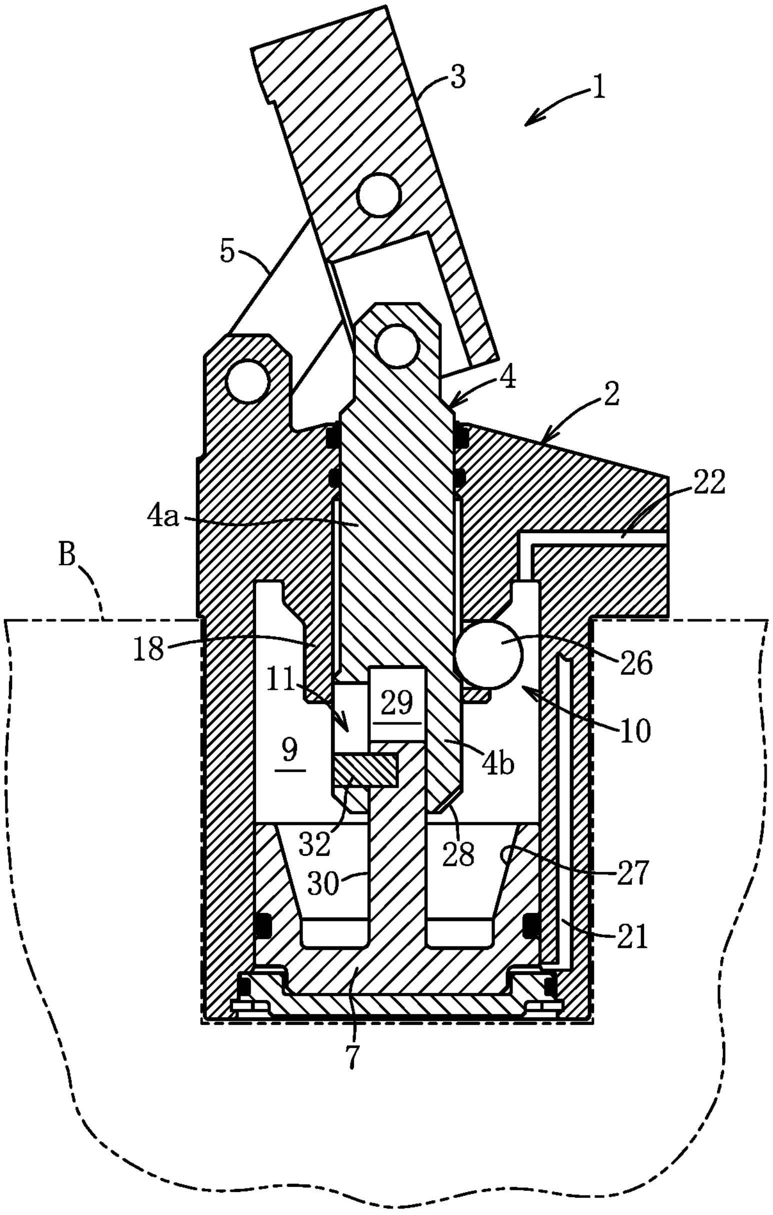
FIG. 2 is a sectional view of the clamp apparatus (unclamped state) of the first embodiment.

The clamp apparatus 1 according to this first embodiment is shown in FIGS. 1 and 2: FIG. 1 shows the clamp apparatus in the clamped state in which it has clamped a workpiece W, while FIG. 2 shows the clamp apparatus in the unclamped state. As shown in FIGS. 1 and 2, this clamp apparatus 1 is a link type clamp apparatus that, as main structural elements, comprises a clamp main body 2, a clamp arm 3, an output rod 4, a link member 5, a cylinder bore 6, a piston member 7, first and second fluid pressure operation chambers 8, 9, a force multiplying mechanism 10 (servomechanism), a link mechanism 11, and so on.

The clamp main body 2 comprises an upper main body portion 2*a* and a lower main body portion 2*b* that extends integrally downward from the lower end of the upper main body portion 2*a*, with an installation surface 2*c* being formed on the lower end of the upper main body portion 2*a*. The lower main body portion 2*b* is inserted into and installed in a fitting hole 12 formed in a base member B, and, in the state in which the installation surface 2*c* is contacted against the upper surface of the base member B, the upper main body portion 2*a* is fixed to the base member B by a plurality of bolts (not shown in the figures).

A link portion 2*d* that projects upward is formed at one end portion of the upper main body portion 2*a*, and the lower end portion of a link member 5 is coupled to this link portion 2*d* by a pin member 13, with the upper end portion of this link member 5 being coupled to an intermediate portion of the clamp arm 3 by a pin member 14. And the base end portion of the clamp arm 3 is coupled to the upper end portion of the output rod 4 by a pin member 15.

The cylinder bore 6, which is vertically oriented and has a vertical axis, is formed in the lower main body portion 2*b*, with an annular groove 9*a* being formed in the upper main body portion 2*a* and communicating to the upper end of the cylinder bore 6. In the central portion of the upper main body portion 2*a*, there are formed a rod hole 16 having a smaller diameter than the cylinder bore 6 and a small diameter cylinder bore 17 continuing downward from the lower end of the rod hole 16 and having a slightly larger diameter than the rod hole 16, with a tubular portion 18 that is forming the lower end portion of the small diameter cylinder bore 17 being formed integrally with the upper main body portion 2*a*, and with the tubular portion 18 protruding from above into the upper end portion of the cylinder bore 6.

The output rod 4 comprises a rod main body portion 4*a* that is inserted into the rod hole 16 and that projects to the exterior from the upper end of the upper main body portion 2*a*, and a rod base portion 4*b* that extends downward from the rod main body portion 4*a* and that moreover is installed in the small diameter cylinder bore 17 so as to slide up and down therein freely. A seal member 16*a* and a scraper 16*b* are installed in the internal circumferential portion of the rod hole 16. The cylinder bore 6 is a cylindrical hole, and the lower end of this cylinder bore 6 is blocked up by a blocking plate 19 that is fitted into the lower end portion of the lower main body portion 2*b*, with the blocking plate 19 being fixed by a stop ring 20. A seal member 19*a* is installed to the external circumferential portion of the blocking plate 19.

The piston member 7 is installed into the cylinder bore 6 so as to slide freely vertically therein and so as to partition the cylinder bore 6 in the vertical direction, so that, in the cylinder bore 6, a first fluid pressure operation chamber 8 is defined below the piston member 7, and a second fluid pressure operation chamber 9 is defined above the piston member 7. A seal member 7*a* is installed on the external circumferential portion of the piston member 7. An annular groove 7*b* is formed around the upper surface portion of the piston member 7, and the tubular portion 18 is formed so as to be capable of protruding into the annular groove 7*b*.

A first fluid passage 21 that supplies and drains pressurized air (i.e. a pressurized fluid) to and from the first fluid pressure operation chamber 8 and a second fluid passage 22 that supplies and drains pressurized air (i.e. a pressurized fluid) to and from the second fluid pressure operation chamber 9 are formed in the clamp main body 2, and the first and second fluid passages 21, 22 are connected to a pressurized air supply source 23.

A fluid passage 24 is defined at the lower end portion of the small diameter cylinder bore 17, and, when the piston member 7 is pushed upward at light load by fluid pressure in the first fluid pressure operation chamber 8, due to back pressure in the second fluid pressure operation chamber 9, the fluid passage 24 causes this back pressure to be received by the output rod 4, so that the output rod 4 operates to advance.

A force multiplying mechanism 10 for the force to be transmitted to the output rod 4 is provided, and multiplies the force acting on the piston member 7 due to fluid pressure in the first fluid pressure operation chamber 8 when, in the later stage of elevation operation, the piston member 7 is pushed upward at heavy load. Moreover, a link mechanism 11 is also provided that links the output rod 4 and the piston member 7, and that, during unclamping operation in which the piston member 7 is being lowered, operates after the piston member 7 has been lowered through a predetermined stroke.

The force multiplying mechanism 10 comprises: the tubular portion 18 that is formed on the upper main body portion 21 and projects from above into the second fluid pressure operation chamber 9; a plurality of steel balls 26 (i.e., spheres) that are installed in a plurality of support holes 25 formed in the tubular portion 18 so as to be movable in these holes 25 in radial directions; a first part conical surface 27 that is formed on the external circumferential portion of the annular groove 7*b* of the piston member 7 so that its diameter increases upward, and a second part conical surface 28 that is formed on the lower end portion of the output rod 4 so that its diameter increases upward.

The first part conical surface 27 is formed so as to slope by around 10° to 20° with respect to the vertical direction, and so that it can contact the plurality of steel balls 26. And the second part conical surface 28 is formed so as to slope by around 40° to 50° with respect to the horizontal direction, and so that it can contact the plurality of steel balls 26. The diameters of the steel balls 26 are around 2.25 to 2.50 times the thickness of the wall portion of the tubular portion 18. It should be understood that the above numerical values are only examples, and are not intended to be limitative.

The link mechanism 11 comprises: a rod insertion hole 29 that is formed in the lower end portion of the output rod 4 and whose lower end is open; a connecting rod 30 that is formed integrally with the piston member 7 and that is inserted into the rod insertion hole 29 from below so as to slide freely therein; an elongated hole 31 that is formed in the cylindrical wall surrounding the rod insertion hole 29 of the output rod 4, so as to extend vertically; a link pin 32 that is fixed to the connecting rod 30 and that is loosely fitted into the elongated hole 31; and so on.

Next, the operation of this link type clamp apparatus 1 will be explained.

During the unclamped state in which pressurized air is supplied to the second fluid pressure operation chamber 9 and pressurized air is discharged from the first fluid pressure operation chamber 8, as shown in FIG. 2, the piston member 7 is in its lower limit position, and the clamp arm 3 is in an upward tilted state. And, when clamp driving is performed from this unclamped state, pressurized air is supplied to the first fluid pressure operation chamber 8, and pressurized air is discharged from the second fluid pressure operation chamber 9.

At this time, as the piston member 7 is pushed upward at light load by the fluid pressure in the first fluid pressure operation chamber 8, since back pressure is generated within the second fluid pressure operation chamber 9 due to the rising of the piston member 7, accordingly the output rod 4 receives this back pressure, and is driven upward along with the piston member 7 until the clamp arm 3 contacts against the workpiece W, and thereafter only the piston member 7 is driven further towards clamping operation, and the first part conical surface 27 of the force multiplying mechanism 10 contacts against the steel balls 26, while an output portion 3*a* at the tip end portion of the clamp arm 3 presses against the upper surface of the workpiece W and the clamped state is established (refer to FIG. 1).

Moreover, at this time, in the force multiplying mechanism 10, since the first part conical surface 27 pushes the steel balls 26 diagonally upward strongly, accordingly the second part conical surface 28 is pushed upward more strongly, and the workpiece W is put into a clamped state by the clamp arm 3. The force multiplying factor of this force multiplying mechanism 10 is approximately two times, so that the output rod 4 is driven upward for clamping with a force that is approximately twice the force with which the piston member 7 is driven for clamping by the pressurized air in the first fluid pressure operation chamber 8, and thus the workpiece W is pushed against the base member B with a strong force and is put into the clamped state. During this clamped state, a predetermined gap is present between the link pin 32 of the link mechanism 11 and the lower end of the elongated hole 31.

Next, when the clamping is to be released, pressurized air is supplied to the second fluid pressure operation chamber 9 while the fluid pressure in the first fluid pressure operation chamber 8 is discharged. Since, when this is done, while the piston member 7 lowers through a predetermined stroke that corresponds to the predetermined clearance described above, the output rod 4 remains just as it is in the stopped state while the piston member 7 thus shifts downward, and, after the piston member 7 has lowered through the predetermined stroke the link pin 32 comes into contact with the lower end of the elongated hole 31, accordingly the piston member 7 and the output rod 4 come into a linked state and shift further downward in unison, so that the unclamped state shown in FIG. 2 is established.

Next, the beneficial effects provided by this clamp apparatus 1 will be explained.

Since, with the piston member 7 partitioning the cylinder bore 6 vertically, the shown structure is provided in which the piston member 7 receives the pressure of the pressurized air within the first fluid pressure operation chamber 8, and the force generated on the piston member 7 is multiplied by the force multiplying mechanism 10 and is transmitted to the output rod 4, accordingly it is possible to strengthen the clamping force, and it is possible to anticipate that the clamp apparatus 1 may be made more compact. It is possible to provide a structure in which the piston member 7 divides the cylinder bore 6 vertically, since, when the piston member 7 is performing movement under light load, the output rod 4 performs advancing operation due to receiving the back pressure within the second fluid pressure operation chamber 9, so that it is not necessary for the pressurized air in the first fluid pressure operation chamber 8 to operate on the output rod 4.

Moreover since the link mechanism 11 is provided that, during the unclamping operation in which the piston member 7 moves downward, links together the output rod 4 and the piston member 7 after the piston member 7 has descended through a predetermined stroke, and since the output rod 4 is kept in its stopped state until the piston member 7 has descended through the predetermined stroke, accordingly the operation of lowering the piston member 7 with respect to the output rod 4 is not delayed, and no unreasonable force operates on the force multiplying mechanism 10. In other words, since the output rod 4 is biased upward by receiving the pressure of the pressurized air in the second fluid pressure operation chamber 9, accordingly its operation for moving downward is delayed to be subsequent to that of the piston member 7.

And the force multiplying mechanism 10 has a simple construction, since it includes the tubular portion 18 of the clamp main body 2, the plurality of steel balls 26, the first part conical surface 27 formed on the piston member 7, and the second part conical surface 28 formed on the lower end portion of the output rod 4.

Moreover, the link mechanism 11 has a simple structure and has excellent reliability, since it includes the rod insertion hole 29 at the lower end portion of the output rod 4, the connecting rod 30 that is formed on the piston member 7 and is inserted into the rod insertion hole 29, the elongated hole 30 that is formed on the cylindrical wall that surrounds the rod insertion hole 29, and the link pin 32 that is fixed to the connecting rod 30 and that is loosely fitted into the elongated hole 31.

Embodiment 2

Figure 3:
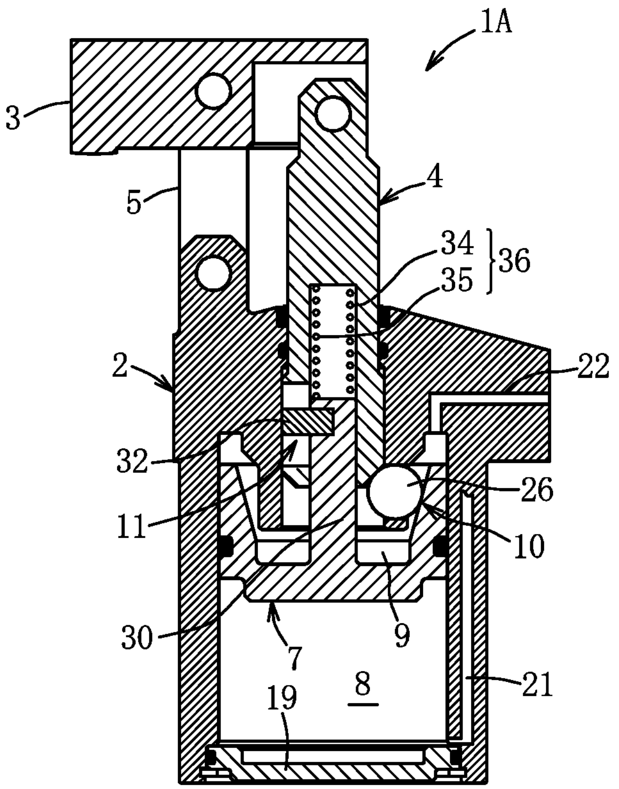
FIG. 3 is a sectional view of a clamp apparatus (clamped state) of a second embodiment.

A clamp apparatus 1A according to a second embodiment will now be explained with reference to FIG. 3.

However, since a great portion of this clamp apparatus 1A is the same as the clamp apparatus 1 described above, accordingly similar reference symbols are appended to structural elements that are similar, with explanation thereof being omitted, and with the explanation focusing on those structures that are different.

In this clamp apparatus 1A, there is provided a biasing means 36 that biases the output rod 4 upward with respect to the piston member 7, and that comprises a spring reception hole 34 that extends from the rod insertion hole 29 upward and a compression spring 35 that is received in the spring reception hole 34. Thus, when the piston member 7 shifts upward under light load, the rising operation of the output rod 4 becomes smooth.

Embodiment 3

Figure 4:
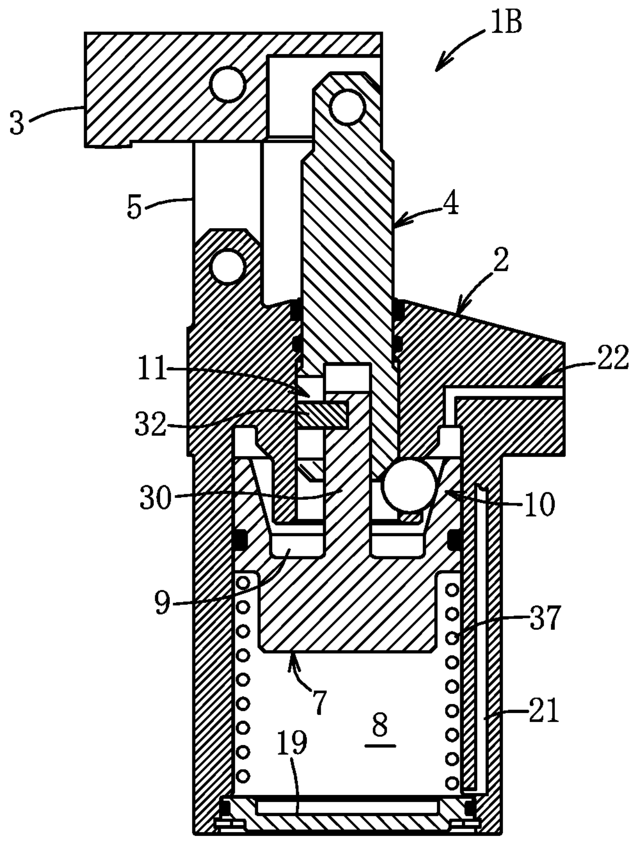
FIG. 4 is a sectional view of a clamp apparatus (clamped state) of a third embodiment.

A clamp apparatus 1B according to a third embodiment will now be explained with reference to FIG. 4.

However, since a great portion of this clamp apparatus 1B is the same as the clamp apparatus 1 described above, accordingly similar reference symbols are appended to structural elements that are similar, with explanation thereof being omitted, and with the explanation focusing on those structures that are different.

A compression spring 37 that biases the piston member 7 upward to the clamping operation side is installed in the first fluid pressure operation chamber 8. However, it will be supposed that the elastic force of the compression spring 37 is set to be weaker than the unclamping drive force acting in the downward direction on the piston member 7 due to the fluid pressure in the second fluid pressure operation chamber 9. Since the compression spring 37 is provided, accordingly it is possible to increase the drive force for clamping, and to strengthen the holding force that maintains the clamped state.

Embodiment 4

A clamp apparatus 1C according to a fourth embodiment will now be explained with reference to FIGS. 5 through 8. However, since a great portion of this clamp apparatus 1C is the same as the clamp apparatus 1 described above, accordingly similar reference symbols are appended to structural elements that are similar, with explanation thereof being omitted, and with the explanation focusing on those structures that are different.

In this clamp apparatus 1C, a poor clamping detection mechanism 40 that detects poor clamping is provided. This poor clamping detection mechanism 40 comprises a fluid passage 41 within the clamp main body 2 and an open/close valve mechanism 42 that is capable of opening and closing an intermediate portion of this fluid passage 41. The open/close valve mechanism 42 is built to stay in a first state of being closed in the state in which the piston member 7 has not reached its upper shifting limit position, while changing over to a second state of being open in the state in which the piston member 7 has arrived at its upper shifting limit position.

The open/close valve mechanism 41 comprises a valve body reception hole 43 formed in the upper main body portion 2*a*, a valve body 44 that is received in the valve body reception hole 43 and can move vertically therein, and a compression spring 45 that biases the valve body 44 in the closing direction. The valve body reception hole 43 consists of a small diameter hole 43*a* that opens to the annular groove 9*a*, and a large diameter hole 43*b* that connects to the upper end of the small diameter hole 43*a*.

The valve body 44 comprises: a small diameter portion 44*a* that is inserted into the small diameter hole 43*a* with a tubular gap being left between them, thus sliding freely therein, and that is somewhat longer than the small diameter hole 43*a*; and a large diameter portion 44*b* that extends upward from the upper end of the small diameter portion 44*a*, and that is installed in the large diameter hole 43*b* so as to slide freely therein, as well as being approximately half of the length of the large diameter hole 43*b*. A seal member 46*a* is installed in the internal circumferential portion of the small diameter hole 43*a* near its lower end, and a seal member 46*b* is also installed around the external circumference of the large diameter portion 44*b*.

An annular valve face 47 is formed on the lower end of the large diameter portion 44*b*, and an annular valve seat 48 is formed on the bottom portion of the large diameter hole 43*b* so as to oppose the annular valve face 47; and, moreover, the valve body 44 is biased downward (in the closing direction) by a compression spring 45 that is installed in the large diameter hole 43*b*. Incidentally, a through hole 49 for breathing is formed in the center portion of the valve body 44, and this structure makes it possible, during the unclamped state, to maintain the valve closed state by introducing the pressurized air of the second fluid pressure operation chamber 9.

A fluid passage 41 comprises a first passage 41*a* that opens to the upper portion of the small diameter hole 43*a* and a second passage 41*b* that opens to the outer circumferential surface of the lower end portion of the large diameter hole 43*b*, and, during the valve closed state in which the annular valve face 47 is contacted against the annular valve seat 48, the lower end portion of the small diameter portion 44*a* is projected into the annular groove 9*a* of the second fluid pressure operation chamber 9. The first passage 41*a* is connected to a pressurized air supply source 51 via an external passage 50, and the second passage 41*b* is open to atmosphere, with a pressure switch 52 or a pressure sensor being connected to the external passage 50.

The operation and the beneficial effects provided by the poor clamping detection mechanism 40 will now be explained.

Figure 5:
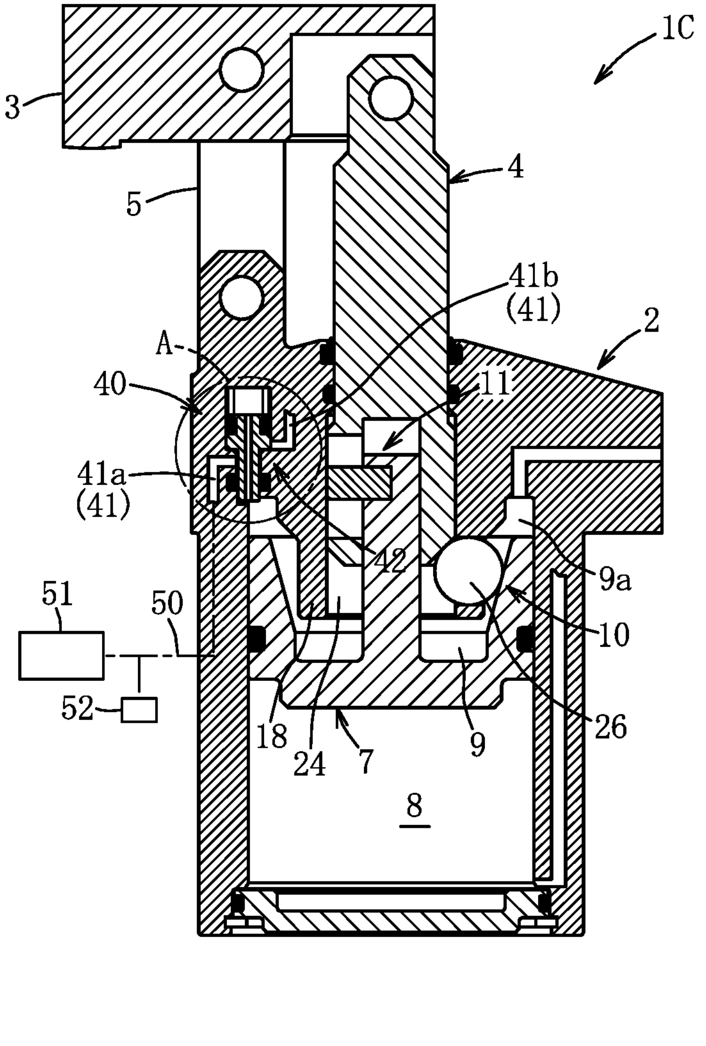
FIG. 5 is a sectional view of a clamp apparatus (clamped state) of a fourth embodiment.
Figure 6:
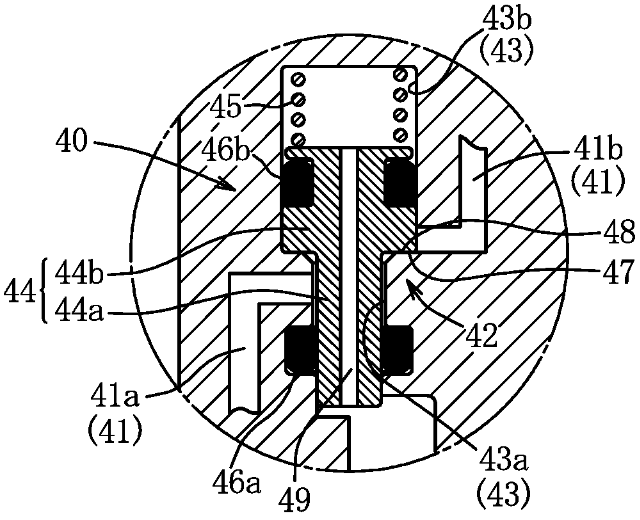
FIG. 6 is an enlarged view of a portion A of FIG. 5.
Figure 7:
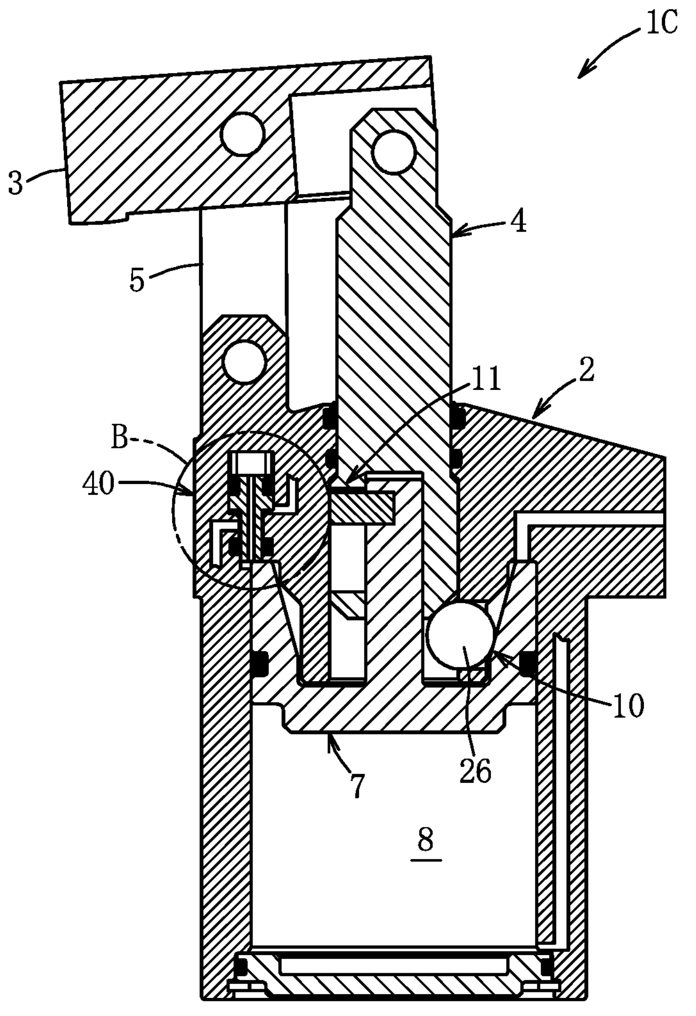
FIG. 7 is a sectional view of the clamp apparatus (in a poorly clamped state) of the fourth embodiment.
Figure 8:
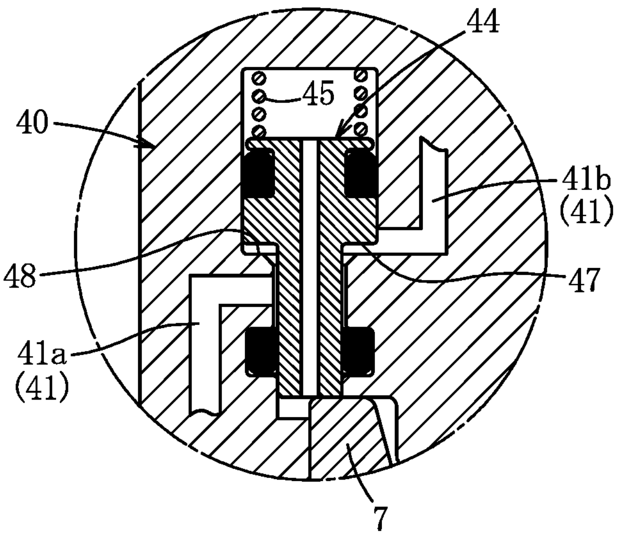
FIG. 8 is an enlarged view of a portion B of FIG. 7.

As shown in FIGS. 5 and 6, since during the normally clamped state the piston member 7 does not press the small diameter portion 44*a* of the valve body 44 upward, accordingly the closed state of the open/close valve mechanism 42 is maintained, and the air pressure detected by the pressure switch 52 is "high". However if, as shown in FIGS. 7 and 8, during clamp driving, the piston member 7 arrives at its upper shifting limit position due to poor clamping that may occur due to no workpiece W being present or due to the total height of the workpiece W being too small or the like, then, since the piston member 7 pushes the small diameter portion 44*a* of the valve body 44 upward, accordingly the open/close valve mechanism 42 goes into the open state, so that the air pressure detected by the pressure switch 52 is "low". It is possible to detect poor clamping in this manner.

Next, examples in which the above embodiments are partially altered will be explained.

1) While the clamp apparatuses 1 and 1A through 1C described above were clamp apparatuses that were driven by pressurized air, it would also be acceptable for them to be clamp apparatuses that are driven by hydraulic pressure, instead of pressurized air.

2) The open/close valve mechanism 40 of the clamp apparatus 1C has only been cited by way of example, it would also be possible to employ an open/close valve mechanism having a different structure. For example, it would also be possible to employ an open/close valve mechanism that is open during the normally clamped state, and that is closed during poor clamping.

3) While the clamp apparatuses 1 and 1A through 1C described above are link type clamp apparatuses, the present invention could also be applied to a clamp apparatus that is not a link type clamp apparatus, but is of any of various other types.

4) Apart from the above, for a person skilled in the art, it would of course be possible to implement the present invention in various ways that include changes, without deviating from the gist of the present invention.

The present invention provides various types of clamp apparatus for fixing a workpiece W or a tool of some type that is to be supplied for machining processing.

The invention claimed is:

1. A clamp apparatus, comprising a clamp main body, an output rod that is fitted in the clamp main body so as to move freely upward and downward therein and capable of projecting out from an upper end of the clamp main body, and a vertically oriented cylinder bore formed within the clamp main body, and further comprising:

a sliding piston member that vertically partitions the cylinder bore and is made of a single member separate from the output rod;

first and second fluid pressure operation chambers defined in the cylinder bore below and above the piston member;

a fluid passage configured to cause, during an upward light-load stroke of the piston member due to fluid pressure in the first fluid pressure operation chamber, a back pressure in the second fluid pressure operation chamber to be received by the output rod, so that said output rod is advanced thereby;

a force multiplication mechanism configured so that, during a heavy-load stroke of the piston member at the conclusion of raising operation thereof, the force multiplication mechanism multiplies a force acting on the piston member due to the fluid pressure in the first fluid pressure operation chamber, and transmits this force to the output rod; and a link mechanism configured so that, during unclamping lowering operation of the piston member, the link mechanism links together the output rod and the piston member after lowering by a predetermined stroke amount.

2. A clamp apparatus according to claim 1, wherein the force multiplication mechanism comprises: a tubular portion that is formed on the clamp main body so as to project from above into the second fluid pressure operation chamber; a plurality of spheres that are installed in a plurality of support holes of the tubular portion so as to be movable in radial directions; a first part conical surface that is formed on the piston member so as to become larger in diameter upward; and a second part conical surface that is formed on a lower end portion of the output rod so as to become larger in diameter upward.

3. A clamp apparatus according to claim 1, wherein the link mechanism comprises: a rod insertion hole that is formed in a lower end portion of the output rod and whose lower end is open; a connecting rod that is inserted into the rod insertion hole from below so as to slide freely therein, and that is formed integrally with the piston member; an elongated hole that is formed in a cylindrical wall of the output rod surrounding the rod insertion hole and that is slender in the vertical direction; and a link pin that is fixed to the connecting rod and is loosely fitted in the elongated hole.

4. A clamp apparatus according to claim 3, further comprising a biasing means comprising a spring reception hole extending from the rod insertion hole upward and a compression spring housed in the spring reception hole, and that biases the output rod upward with respect to the piston member.

5. A clamp apparatus according to claim 1, further comprising a compression spring that is installed in the first fluid pressure operation chamber and that biases the piston member upward toward clamping operation.

6. A clamp apparatus according to claim 1, further comprising a poor clamping detection mechanism comprising a fluid passage formed within the clamp main body and an open/close valve mechanism configured to open and close an intermediate portion of the fluid passage and to maintain a first state of being closed or open in a state in which the piston member has not arrived at its upper shifting limit position and to change over to a second state of being open or closed in a state in which the piston member has arrived at its upper shifting limit position.

7. A clamp apparatus according to claim 1, which is a link type clamp apparatus comprising a clamp arm that is coupled by a pin to an outer end portion of the output rod, and a link member that links an intermediate portion of the clamp arm to the clamp main body.

* * * * *